(12) United States Patent
Whitehead et al.

(10) Patent No.: US 9,357,114 B1
(45) Date of Patent: May 31, 2016

(54) DUAL CAMERA FIFTH WHEEL SYSTEM

(71) Applicants: Peter J. Whitehead, Grafton, WI (US);
Marc J. Robert, Mukwonago, WI (US);
Jeffery R. Porter, New Berlin, WI (US);
Colin Norton, Milwaukee, WI (US)

(72) Inventors: Peter J. Whitehead, Grafton, WI (US);
Marc J. Robert, Mukwonago, WI (US);
Jeffery R. Porter, New Berlin, WI (US);
Colin Norton, Milwaukee, WI (US)

(73) Assignee: VELVAC INCORPORATED, New Berlin, WI (US)

( * ) Notice: Subject to any disclaimer, the term of this patent is extended or adjusted under 35 U.S.C. 154(b) by 0 days.

(21) Appl. No.: 14/816,430

(22) Filed: Aug. 3, 2015

(51) Int. Cl.
*H04N 5/225* (2006.01)
*H04N 7/18* (2006.01)
*B60R 1/00* (2006.01)
*H04N 5/247* (2006.01)

(52) U.S. Cl.
CPC .............. *H04N 5/2252* (2013.01); *B60R 1/003* (2013.01); *H04N 5/247* (2013.01); *H04N 7/181* (2013.01); *B60R 2300/105* (2013.01); *B60R 2300/404* (2013.01); *B60R 2300/808* (2013.01)

(58) Field of Classification Search
CPC ............. G03B 17/56; B60R 2300/105; B60R 2300/404; B60R 2300/808
See application file for complete search history.

(56) References Cited

U.S. PATENT DOCUMENTS

| 4,214,266 | A | * | 7/1980 | Myers | B60Q 1/22 348/118 |
|---|---|---|---|---|---|
| 2003/0122929 | A1 | * | 7/2003 | Minaudo | B60R 1/00 348/148 |
| 2005/0043583 | A1 | * | 2/2005 | Killmann | A61B 1/00016 600/109 |
| 2011/0261167 | A1 | * | 10/2011 | Shin | H04N 13/0239 348/47 |
| 2014/0022389 | A1 | * | 1/2014 | Kageta | H04N 7/183 348/148 |
| 2014/0125795 | A1 | * | 5/2014 | Yerke | B60R 1/00 348/118 |
| 2014/0151979 | A1 | | 6/2014 | Puckett et al. | |

* cited by examiner

*Primary Examiner* — W B Perkey
(74) *Attorney, Agent, or Firm* — Schiff Hardin LLP (57) ABSTRACT

A dual camera system for viewing a coupling of a hitch to a trailer, such as on a semi tractor truck, includes a camera housing having two video cameras. The housing includes two doors that open automatically by a motor, arms and linkages when the vehicle is shifted into reverse. A split screen view is shown to the driver rearward toward the trailer and forward toward the hitch plate. The motor, arms and linkages automatically close the doors after the vehicle is shifted out of reverse, such as after a delay to determine if the hitch latch is secure. The linkages are sliding linkages with a spring so that the doors can be opened manually for cleaning the lenses of the cameras. A heating element is inside the housing.

16 Claims, 11 Drawing Sheets

DUAL CAMERA FIFTH WHEEL SYSTEM

BACKGROUND OF THE INVENTION

1. Field of the Invention

The present invention relates generally to a camera system for use on a vehicle, the camera being directed for showing a reverse view, and more particularly to a camera system mounted to provide a view of a vehicle coupling to a trailer.

2. Description of the Related Art

Drivers of vehicles that are being connected to trailers must move the vehicles backwardly (in reverse) toward the trailers in order to connect the vehicle and trailer to one another. Many people are familiar with the use of cars and trucks to tow travel trailers, camper trailers, boat trailers, cargo trailers, or other types of trailers that are connected to the vehicle using a trailer hitch, sometime referred to as a ball hitch. Coupling a vehicle to one of these trailers often involves having a friend or family member standing nearby signaling and calling out as the vehicle is backed toward the trailer. Some larger trailers are connected to the vehicle using a fifth-wheel hitch in which a portion of the trailer's weight is supported on the towing vehicle. Some travel trailers and livestock trailers use a fifth wheel hitch to connect the trailer to the vehicle. Fifth wheel couplings are commonly used to connect freight trailers to tractor trucks or road tractors in an arrangement known as a tractor-trailer or semi-trailer, or sometimes just referred to as a semi.

For the driver of a semi-trailer truck, connecting the towing vehicle to the semi-trailer can be challenging. A person to guide the operation is not always available. On many road tractors, the driver's visibility of the hitch area is blocked by a sleeper cab. Air flow deflectors and other structures may limit visibility as well.

SUMMARY OF THE INVENTION

The present invention provides a dual camera system with a display in the cab of the tractor for viewing the fifth wheel coupling or hitch to guide the driver in coupling to a trailer. A first camera of the dual camera system is mounted to provide a view rearward of the vehicle to provide a view of the trailer during approach. A second camera provides a view of the hitch or coupling plate of the road tractor for viewing the final stages of coupling and ensuring that the latch has engaged. The cameras are mounted in a housing that encloses the cameras to provide protection from the elements. The housing is attached to the frame of the tractor. The housing includes two doors that automatically open when the cameras are being used and that automatically close when the cameras are not in use. The doors of the housing are constructed to permit a user to open each door without activation of the camera system. The user may inspect and clean the cameras as needed.

DETAILED DESCRIPTION OF THE PREFERRED EMBODIMENTS

Figure 1:
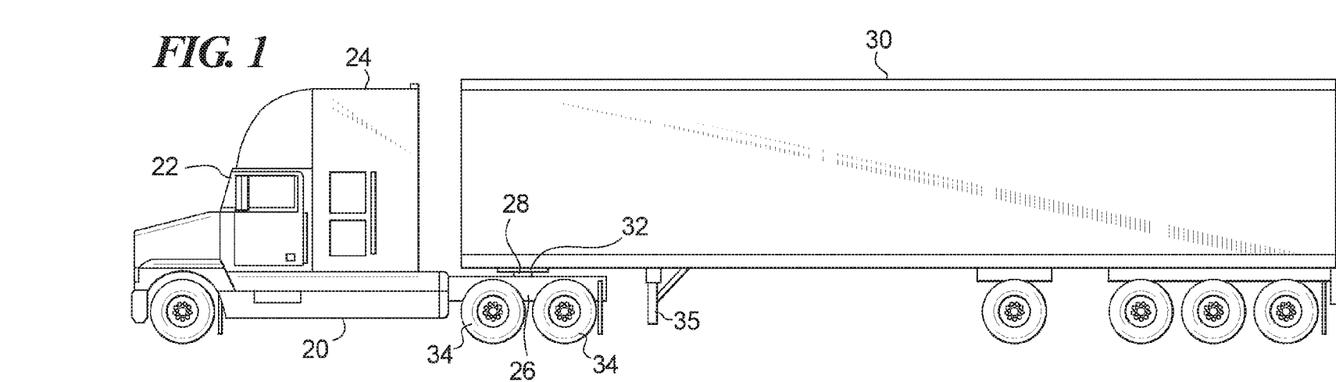
FIG. 1 is a schematic diagram of a semi tractor trailer truck showing the location of the kingpin for connection to the fifth wheel coupling.

In FIG. 1, a road tractor or semi truck tractor 20 includes a cab 22 for the driver and a sleeper portion 24 containing a bed. A rear portion of the frame 26 of the tractor 20 includes a fifth wheel coupling 28. A trailer 30 includes a kingpin 32 that extends downwardly from the underside of the front portion of the trailer 30 for engagement in the fifth wheel coupling 28. The setback location of the kingpin 32 is marked on the figure. The weight of the front portion of the trailer 30 is born by the rear wheels 34 of the tractor 20. A dolly 35 supports the front of the trailer when the trailer 30 is not connected to the tractor 20, the dolly 35 being raised or lowered as needed.

Figure 2:
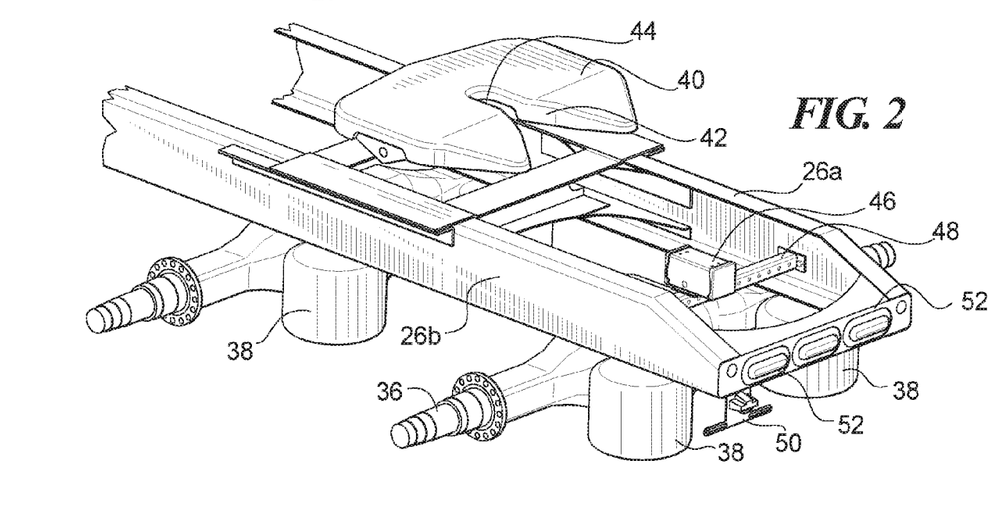
FIG. 2 is a top, side perspective view of a frame and axle of a road tractor showing the dual camera system mounted thereon.

FIG. 2 shows the frame 26 including a right frame member 26*a* and left frame member 26*b*. The rear wheels of the tractor have been removed to reveal one of the rear axles 36. Also visible in this view are the suspension air bags 38 by which the driver may adjust the vertical height of the truck frame 26, for example to facilitate engagement of the fifth wheel coupling. A fifth wheel plate 40 is mounted on the frame 26 that includes a tapered throat opening 42 into which the driver of the truck seeks to guide the kingpin of a trailer 30. The tapered throat opening 42 extends to an engagement opening 44 in the plate 40. When the kingpin of the trailer reaches the engagement opening 44 as the tractor 20 is being backed toward the trailer 30, a latch engages the kingpin and secures the trailer to the tractor.

A camera housing 46 is mounted on a cross beam 48 that extends between the right and left frame members 26*a* and 26*b*. The camera housing 46 is positioned below and rearwardly of the fifth wheel plate 40. The position of the camera housing 46 protects the housing and the cameras mounted therein from direct contact during normal truck operation, but its position low in the truck frame 26 between the rear wheels 34 does subject the housing 46 to rain, snow, ice, mud, grit, grime and road debris as the truck is driven. Also visible in FIG. 2 is a license plate mount 50 and tail lights and backup lights 52.

Figure 3:
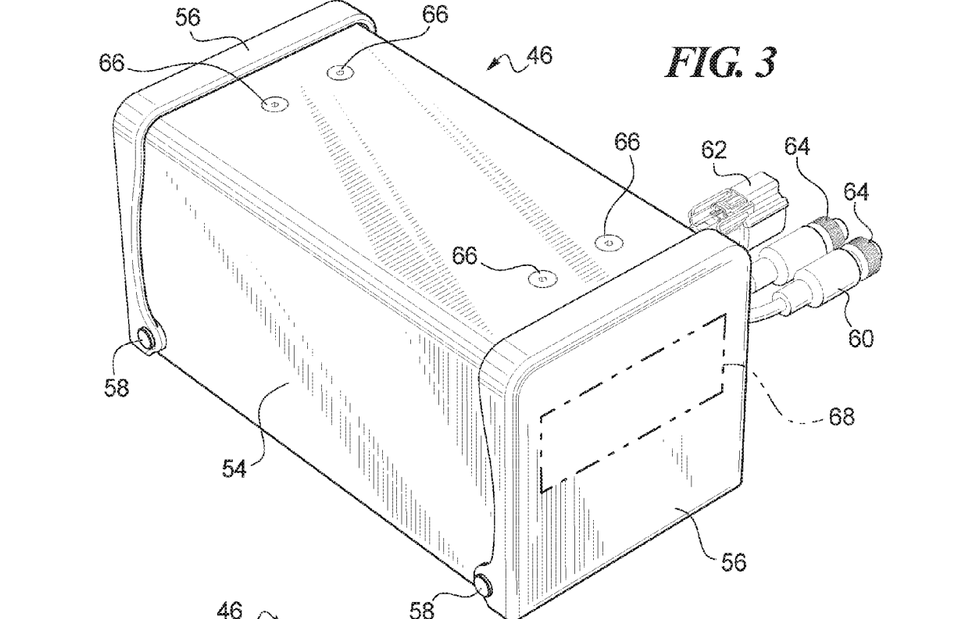
FIG. 3 is a top, side perspective view of the housing for the dual camera system.

Turning to FIG. 3, the camera housing 46 includes a housing body 54 on both ends of which are fastened doors 56. In the illustrated embodiment, the housing body 54 is formed of generally square or rectangular hollow extrusion, for example of metal, such as aluminum or steel. In certain embodiments, the housing body is an extrusion of anodized aluminum. An example of a housing body is an aluminum extrusion having dimensions of approximately 3.5 inches by 3.5 inches and of sufficient length to house the devices shown herein. Other methods of forming the housing body 54, body shapes, and body sizes may be provided as well. The doors 56 are mounted to the housing body 54 by hinge pins 58. The doors 56 may be formed of fiberglass filled nylon in certain embodiments, or may be formed of aluminum, such as anodized aluminum. Electrical connectors and cables 60 extend from the camera housing 46. The connectors and cables 60 include a motor control and power connector and cable 62 and two video signal connectors and cables 64, one video connector and cable for the video signal of each camera within the housing 46. The motor control and power connector and cable 62 provides power to a heating element and power and control signals to a motor, as will be described. For example the connector 62 may carry a door activation signal. Power for the camera system may be provided from the vehicle battery. Four mounting screws 66 are visible in the top of the housing body 54. Indicia 68 may be provided on one or both doors 56 and/or on the housing body 54.

Figure 4:
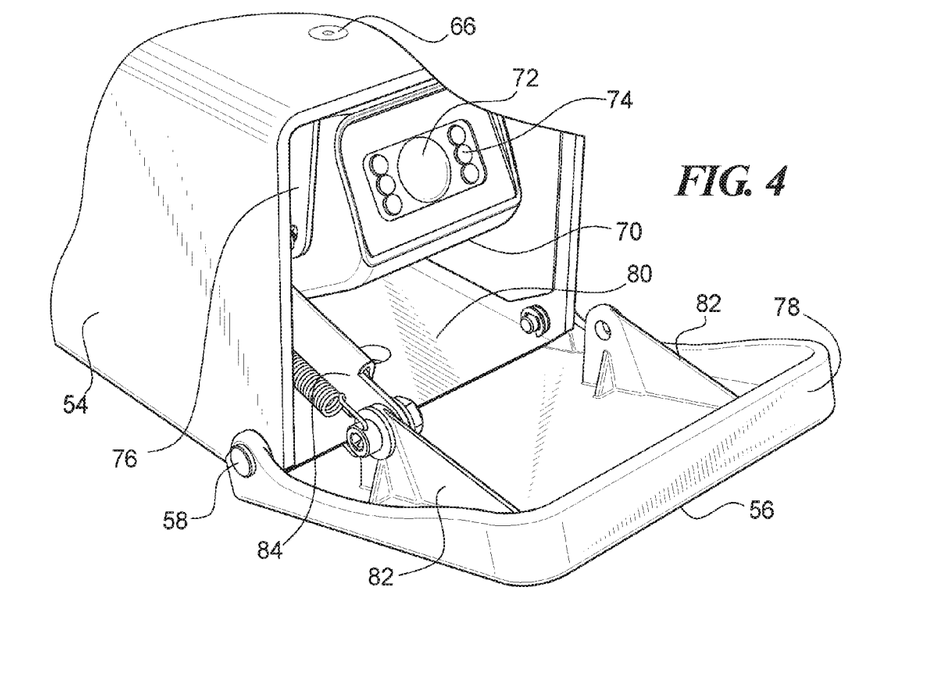
FIG. 4 is a fragmentary perspective view of the housing of FIG. 3 showing one of the doors open.

FIG. 4 shows the camera housing 46 with the door 56 in the open position. The open door 56 reveals a video camera 70 within the housing 46. The video camera 70 has a camera lens 72 and lights 74, such as LED lights, that are directed upwardly at an angle. In the example, a row of three LED lights 74 is provided on each of two opposite sides of the lens 72. The lights may be IR LEDs (infra red light emitting diodes) for use at night. In certain embodiments, operation of the camera 70 results in the lights 74 illuminating a target object that is being imaged by the video camera. The backup lights of the vehicle may be used to illuminate the trailer. The camera 70 is held in position by a camera bracket 76. The camera 70 may be at a fixed angle in the bracket 76 or may be adjustable to permit the user to change the angle. The camera bracket 76 is mounted to the inside top of the housing body 54 by the screws 66.

The door 56 includes a perimeter flange 78 that extends over the top and sides of the housing body 54 when the door 56 is closed. The perimeter flange 78 helps to keep out dirt and grime from the camera compartment 80 within the housing 46. The door 56 has two brackets 82 on the inside of the door. One bracket 82 is also possible. A linkage 84 is connected to one of the brackets 82 for controlling opening and closing movements of the door 56. The linkage 84 is connected to a mechanism within the housing 46, as will be described. A similar arrangement and construction is provided on the opposite end of the housing 46. By providing two brackets 82 on each door, the door 56 to be mounted on either end of the housing and with the corresponding bracket 82 connected to the linkage 84.

Figure 5:
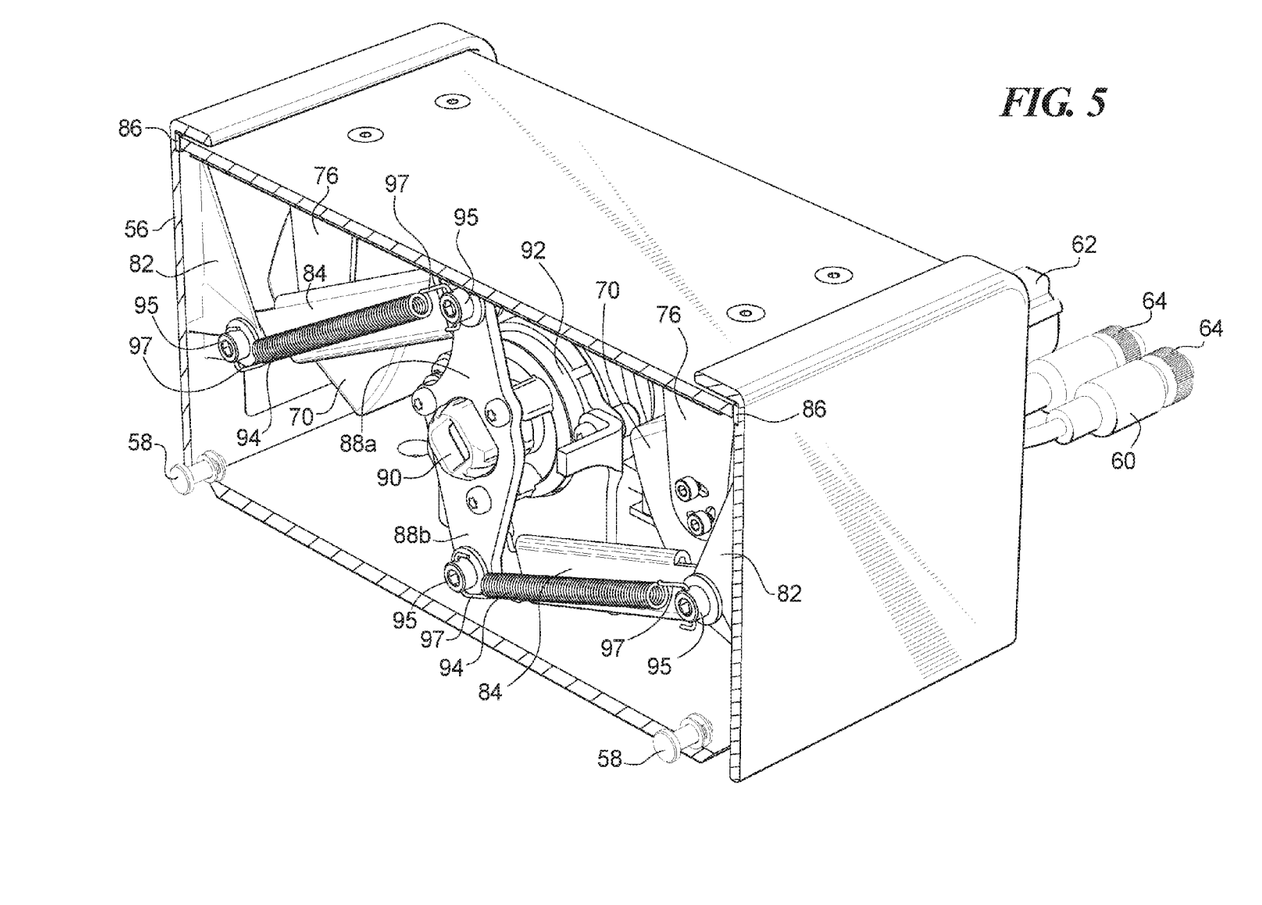
FIG. 5 is a perspective view of the housing from which a side panel has been removed by cross section to reveal internal structures.

With reference to FIG. 5, the housing 46 is shown in greater detail in cross section to reveal inner mechanisms. In particular, the door 56 has a seal gasket 86 between the end of the housing body 54 and the door 56 to seal out water, dust and other contaminants that may enter the housing. The combination of the perimeter flange 78 and the seal gasket 86 help to keep the camera compartment clean and dry.

The linkage 84 connects the bracket 82 on the door 56 to an arm 88a that is mounted on an output shaft 90 of a motor, gear and clutch 92. A second arm 88b extends in the opposite direction from the first arm 88a from the motor output shaft 90 and connects at its opposite end to a second linkage 84 connected to a bracket 82 on the opposite door 56. The linkages 84 each include springs 94, shown as coil springs that are mounted parallel to the linkages 84. The springs 94 may connect from the arm 88 to the bracket 82 or may connect from intermediate connectors, such as connectors on the linkage 84. In the illustrated example, elongated bolts 95 connect each end of the linkages 84 to the respective door brackets 82 and motor arms 88. The elongated bolts 95 include a transverse opening through which hooked ends 97 of the springs 94 are connected. Both ends 97 of the springs 94 connect to the corresponding elongated bolts 95. The components are connected by bolts, screws, rivets or other connectors as is apparent to those of skill in the art.

FIG. 5 shows indicia 96 on a top surface of the housing body 54, for example to warn the users not to step on the camera housing. The indicia 96 may be embossed, printed, added by a sticker or label, or otherwise provided. In certain embodiments, the indicia is printed on the housing. The ends of the hinge pins 58 are shown in this cross-sectional view, the hinge pins including clips that are fastened onto slots on the ends of the hinge pins to secure the doors 56 to the housing body 54.

Figure 6:
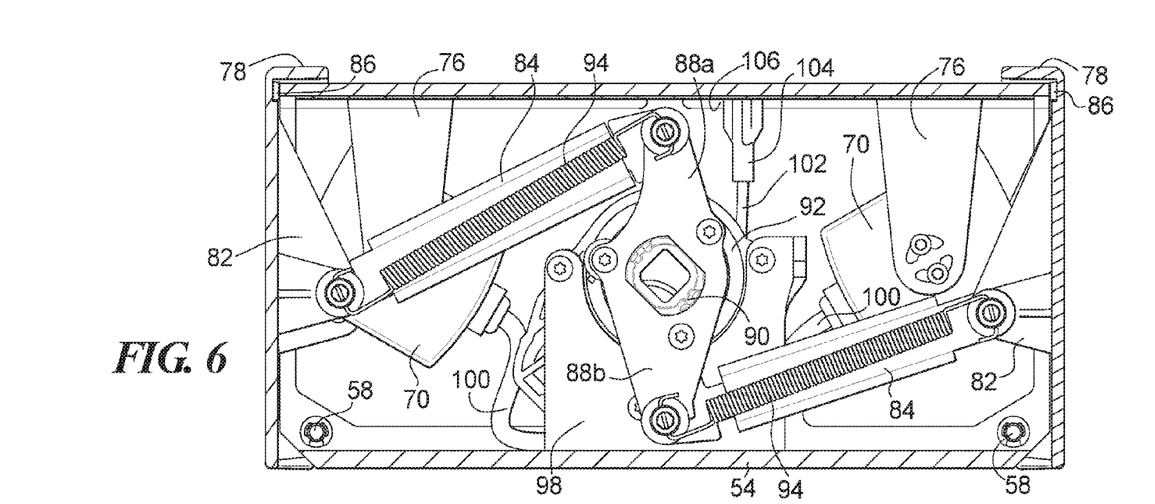
FIG. 6 is an elevational view of the housing and internal mechanisms showing the doors closed.

In FIG. 6, the arm 88 on the motor, gear and clutch 92 is in a vertical orientation. The result is that the linkages 84 are drawn inward, moving the doors 56 to the closed position. The closed doors 56 together with the seal gaskets 86 and perimeter flanges 78 help to keep dirt and moisture off of the cameras 70. The upwardly tilted positions of the two video cameras 70 may be seen in this view. The motor, gear and clutch 92 is mounted in a motor bracket 98 to the bottom of the housing. Video cables 100 extend from each camera 70 to a port or opening through which the cables extend to the outside of the housing. The port or opening, not shown in this view, preferably has a waterproof seal through which the cables extend.

A power cable 102 extends from the port to a connector 104 that connects to one or more heating elements 106 mounted within the housing 46. The heating element 106 of certain embodiments is a flat heating element mounted on the inside surface of the housing body 54, for example, near the doors. In certain embodiments, the heating element 106 is a PTC (positive temperature coefficient) heating element. Other types of heating elements may be provided as well. The heating element 106 is, in certain embodiments, kept on during operation of the vehicle. The heating element 106 ensures that ice does not accumulate on the housing, particularly at the door, so that the door may open when the camera system is used. The heating element 106 helps to dry any moisture that may enter the camera housing 46, and helps to prevent condensation.

Figure 7:
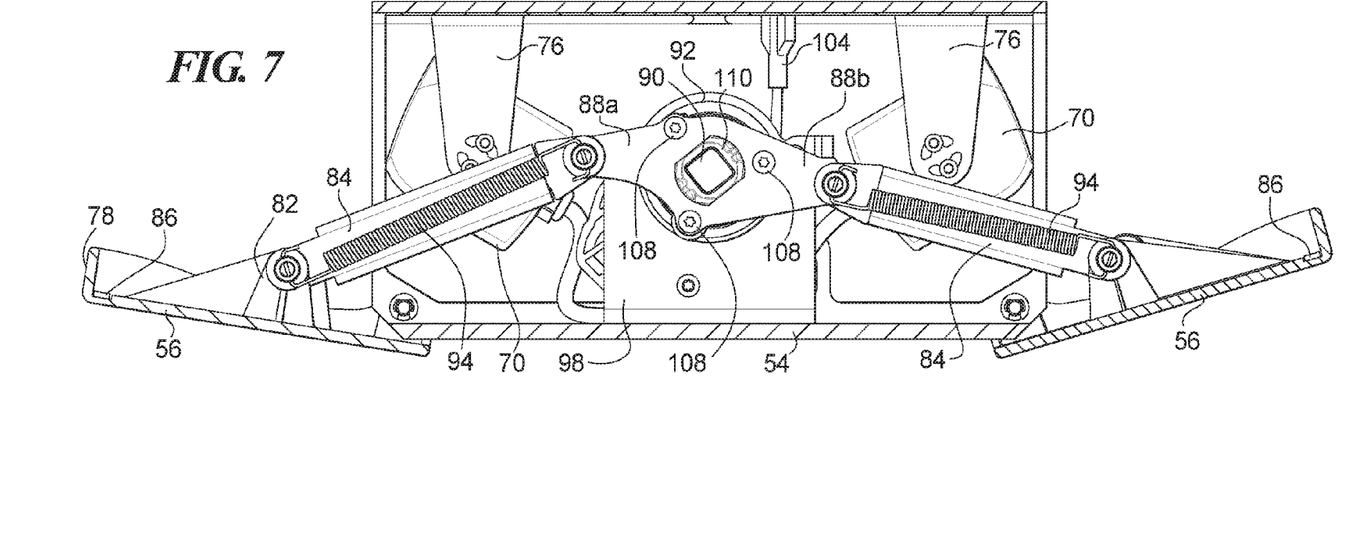
FIG. 7 is an elevational view of the housing and internal mechanisms showing the doors open by operation of the motor.

FIG. 7 shows the camera housing 46 with the doors 56 moved to the open position. In certain embodiments, the camera housing 46 is connected to the vehicle's electronics system to trigger opening of the doors 56 and operation of the video cameras 70 when the vehicle is put into a reverse gear. The doors 56 may be triggered to open when the vehicle is put into any reverse gear, for example on vehicles having multiple reverse gears. The doors 56 are opened by the motor, gear and clutch 92 operating to rotate the arms 88a and 88b from the vertical position shown in FIG. 6 to the horizontal position shown in FIG. 7. To close the doors 56, the motor, gear and clutch 92 is operated to rotate the arms 88a and 88b back to the vertical position. The motor, gear and clutch 92 of certain embodiments has a 90 degree operating range. In an example, the motor, gear and clutch 92 is a type of electric motor unit used for actuating a power folding side mirror of a vehicle. The motor, gear and clutch 92 of the example rotates from stop to stop over its 90 degree operating range. Other motor devices or other actuator devices may be provided for moving the doors between the open and closed positions.

The arms 88a and 88b are connected to the output shaft 90 of the motor, gear and clutch 92 by three bolts 108. The arms 88a and 88b have a center opening 110 at the output shaft 90 of the motor, gear and clutch 92.

The illustrated housing body 54 has opposite open ends that are formed perpendicular to the axis of the housing body 54. The open ends may be angled to the axis of the housing body 54, such as by angling the door openings to face in an upward direction, resulting in the top of the housing body being shorter than the bottom of the housing body.

Figure 8:
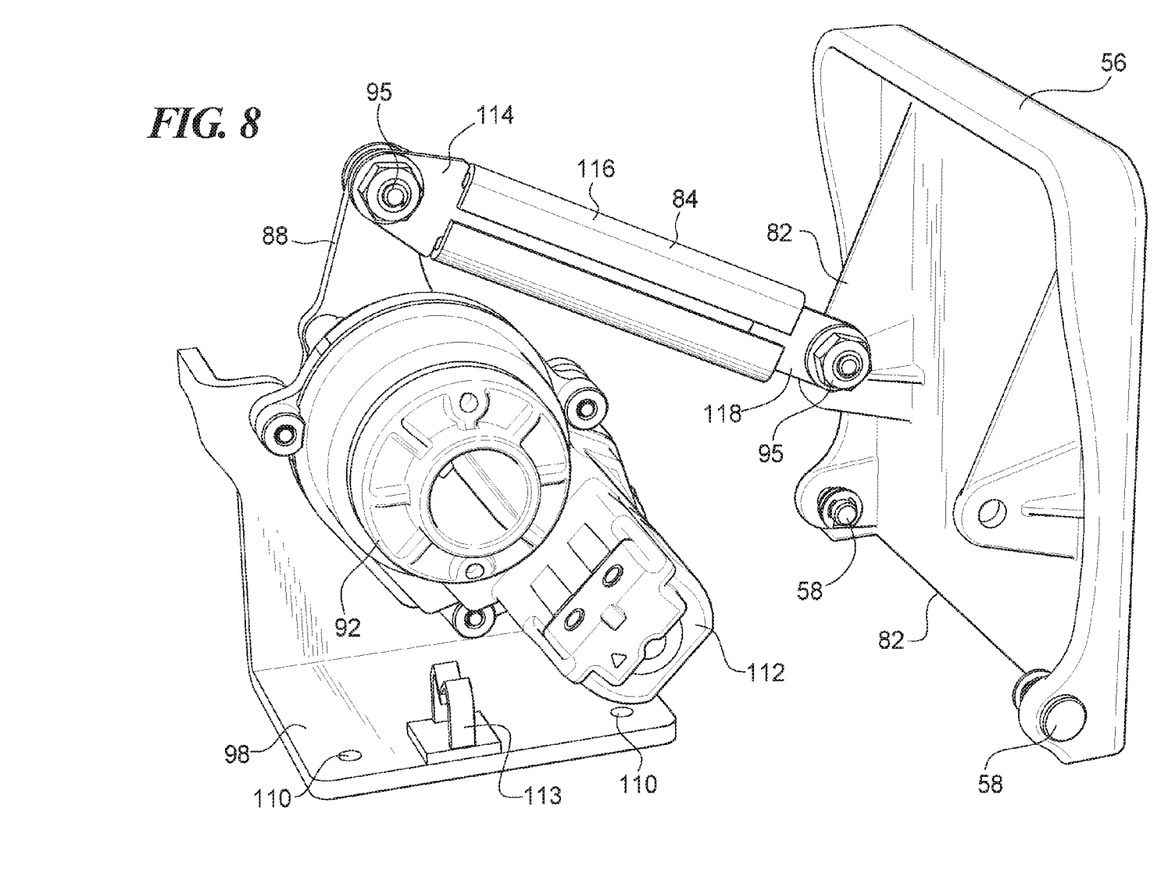
FIG. 8 is an enlarged partial view of a door and door opening mechanism of the housing.

With reference to FIG. 8, the motor, gear and clutch 92 is mounted on the motor bracket 98. The motor bracket 98 is mounted by screws that extend through openings 110 into the housing body 54 (not shown in this view). The motor, gear and clutch 92 includes a 112 mounted to the side of the gear and clutch, labeled as 92 in this view. A cable clip 113 is mounted on the base of the motor bracket 98 for holding the power cable and video cables, as needed. The arm 88 is connected to the motor, gear and clutch 92 and the linkage 84 is connected to the arm 88. The linkage 84 has an inner linkage element 114 and an outer sliding sleeve 116. The outer sliding sleeve 116 is connected to a connector portion 118 that is connected to the bracket 82 of the door 56. The outer sliding sleeve 116 is configured to slide on the inner linkage element 114. The arm 88 is in the vertical position, which is the position of the arm 88 for the door 56 to be in the closed position.

Figure 9:
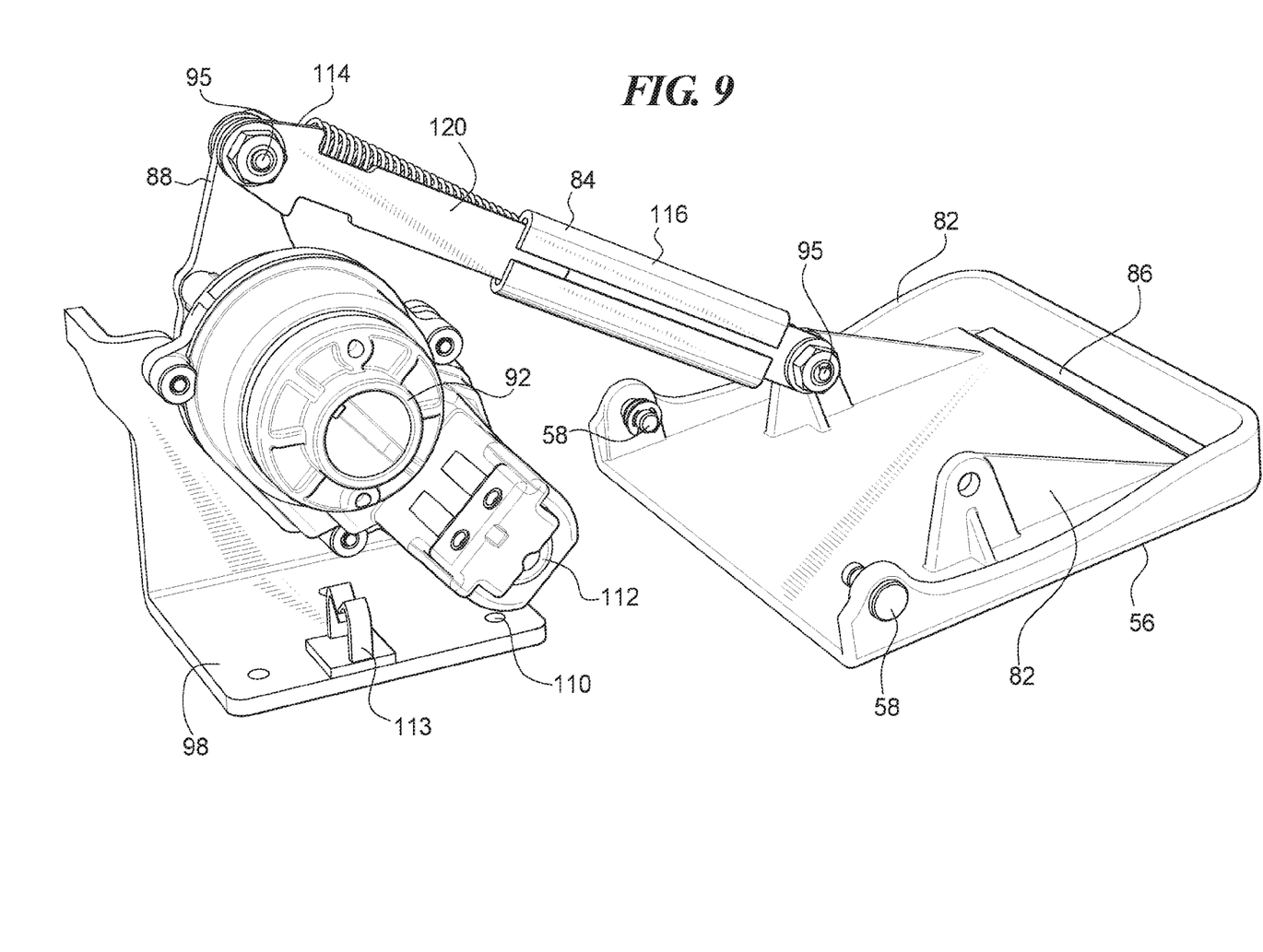
FIG. 9 is an enlarged partial view of the door being manually opened while the motor retains the door closed position.

FIG. 9 shows the motor, gear and clutch 92 with the arm 88 still in the vertical position but with the door 56 in the open position. To move the door 56 to the open position, the outer sliding sleeve 116 is slid along the inner linkage element 114 of the linkage 84 to extend the length of the linkage 84. The lengthening of the linkage 84 exposes an inner element 120 of the inner linkage element 114 that is ordinarily within the sleeve 116. The motor, gear and clutch 92 has not been operated to move the door 56 to the open position as shown. The door 56 may thus be opened automatically by operation of the motor as shown in FIG. 7 or manually as shown in FIG. 9. As will be described, the spring 94 permits the sliding elements of the linkage 84 to move and the linkage 84 to lengthen for manual opening of the door 56. The door 56 is shown disembodied from the housing body 45, camera 70 and other elements of the camera housing for purposes of illustrating the operation of the linkage. In practice, the housing body 45 and other elements are assembled as shown elsewhere in this application.

Figure 10:
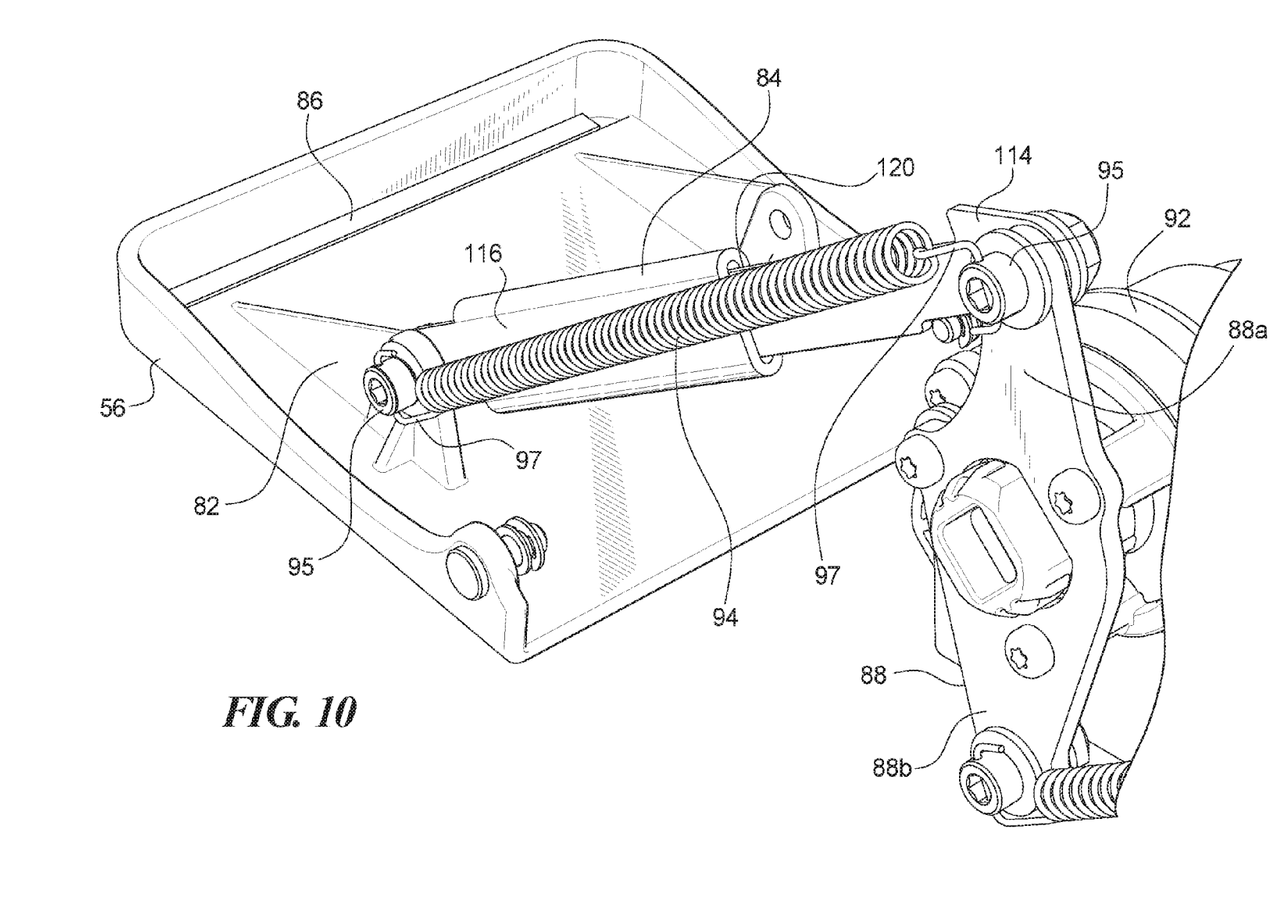
FIG. 10 is a view of the manually opened door of FIG. 9 from the opposite side.

FIG. 10 shows the other side of the manually opened door 56. The spring 94 is stretched as the door 56 is manually pivoted to the open position and the linkage 84 expands by the outer sliding sleeve 116 moving on the inner element 120. The user must overcome the spring force of the spring 94 to open the door 56. The user may manually open the door 56 to wipe dirt, debris and moisture from the camera lens 72, to clean or dry the interior of the camera housing 46, to adjust the angle of the camera 70, to inspect, repair or replace components, or for other reasons. The door 56 may be opened manually without requiring that the vehicle be placed into a reverse gear while the vehicle is running to open the doors.

The cameras 70 can be inspected and the lenses cleaned while the vehicle is off or in idle or neutral gear.

As will be apparent from the foregoing, during the operation of the motor and gear 92 to rotate the arms 88 from the horizontal position shown in FIG. 7 with the doors 56 open to the vertical position shown in FIG. 6, a tension force is exerted on the linkages 84. The sliding configuration of the linkages 84 may permit the doors 56 to remain in the open position as a result of sliding of the linkage if it were not for the springs 94. The spring tension force of the springs 94 on the doors 56 result in the doors 56 being moved from the open position to the closed position. In addition to permitting the user to open the doors 56 manually by overcoming the spring force, the springs 94 permit the doors 56 to remain open or partially open during the automatic closing operation if debris or other objects interfere with the door movement. The user may remove the debris or interfering object and permit the door 56 to close by the spring force without the door or mechanism becoming broken as a result of the interference.

The spring 94 connects from the elongated bolt 95 on the arm 88 to the elongated bolt 95 on the bracket 82 of the door 56 by the hooked ends 97 being engaged through openings in the bolts 95. In practice, the spring 94 is hooked to the bolts 95 and elongates as the linkage 84 is elongates. The spring 94 contracts when the door 56 is released, the spring 94 pulling the door 56 to the closed position. The spring 94 maintains the door 56 in the closed position unless the spring force is overcome to open the door, such as by manual force of a user.

The door on the opposite end of the housing body 54 may be opened manually in the same manner. The linkage 84 connecting the lower arm 88b to the door bracket 82 also has an outer sliding sleeve 116, an inner linkage element 114, and a spring 94 that exerts spring force to maintain the door in a closed position unless manually opened. A user may manually open first one door 56 and then the other to inspect and clean the cameras 70 as needed.

Figure 11A:
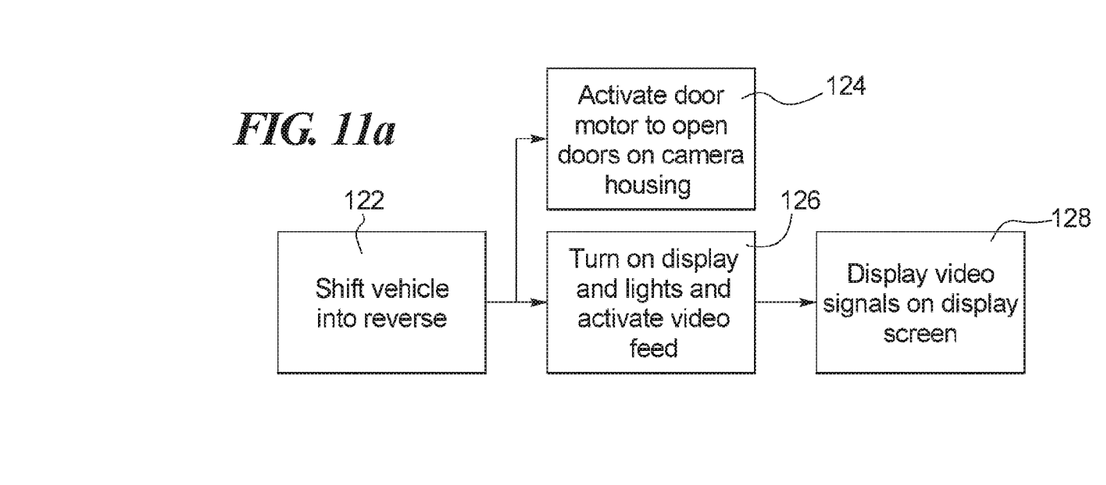
FIGS. 11*a* and 11*b* are flow charts showing the steps for activating and deactivating the video feed of the dual camera system.

FIG. 11a shows the automatic operation for activating the dual camera system. The vehicle 20 is moved into a position by the driver for coupling to a trailer 30, such as by positioning the vehicle with the back end toward the front end of the trailer 30. The driver of the vehicle shifts the vehicle into reverse in block 122 such as by moving the shift lever or other shifting apparatus of the vehicle 20 to a reverse gear position. In vehicles having multiple reverse gears, any reverse gear may be used. The signal that causes the backup lights of the vehicle to come one when shifted into reverse may be used to trigger activation. The signal indicating that the vehicle is in reverse is sent to the motor in the camera housing 46 to cause the motor to move the doors 56 from the closed position to the open position, as shown at block 124. At the same time, the display in the vehicle is turned on, the lights on the cameras are turned on, and the video feed is activated, at block 126. The cameras 70 begin operating and the video signals from the cameras are provided to the display screen, such as a display in the cab 22 of the vehicle, at block 128. If the doors do not open for some reason, the video signal will show the inside of the doors. With the doors open and the video feed on, the driver may view the displayed video as an aid when backing the vehicle 20 toward the trailer 30 and to ensure correct coupling of the hitch mechanism. The steps shown may be performed simultaneously or in any order.

Figure 11B:
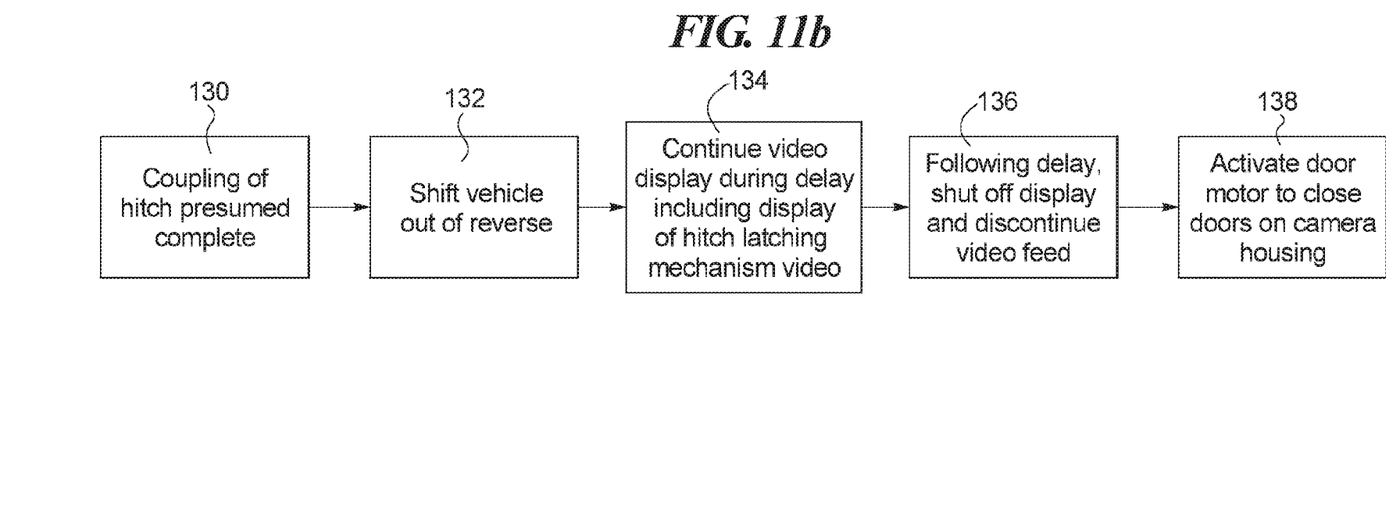

Referring to FIG. 11b, the automatic process for deactivating the dual camera system is shown. The coupling of the hitch to the trailer is presumed complete at block 130. The driver may also deactivate the camera system for other reasons. The driver shifts the vehicle out of the reverse gear at block 132. Instead of the motor immediately closing the doors and the video feed immediately ceasing, the block 134 shows that the camera system continues to operate with the doors open so as to continue to display the video signal on the display screen to show at least the forward view of the hitch latching mechanism. The driver may watch the display during movement of the vehicle in the forward direction, for example, to determine if the hitch has fully latched. The driver may put the vehicle into a forward gear and move the vehicle forward a short distance while watching the display to see of the latch remains secure, a so-called tug test. If the hitch has not fully latched, the driver may be able to determine this fact from the display and may attempt to latch the hitch again by backing the vehicle further toward the vehicle, for example. The driver need not leave the cab of the vehicle and crawl under the vehicle to examine the latching mechanism, since the display remains on for a time. In certain examples, the display may remain on for 30 seconds following the shifting from reverse.

Following the delay time, the display is shut off and the video feed is discontinued, at block 136. In block 138, the motor is activated to move the doors to the closed position on the camera housing. The closing of the doors and deactivation of the video may be interrupted by shifting the vehicle into reverse again. The steps shown may be performed simultaneously or in any order.

Figure 12:
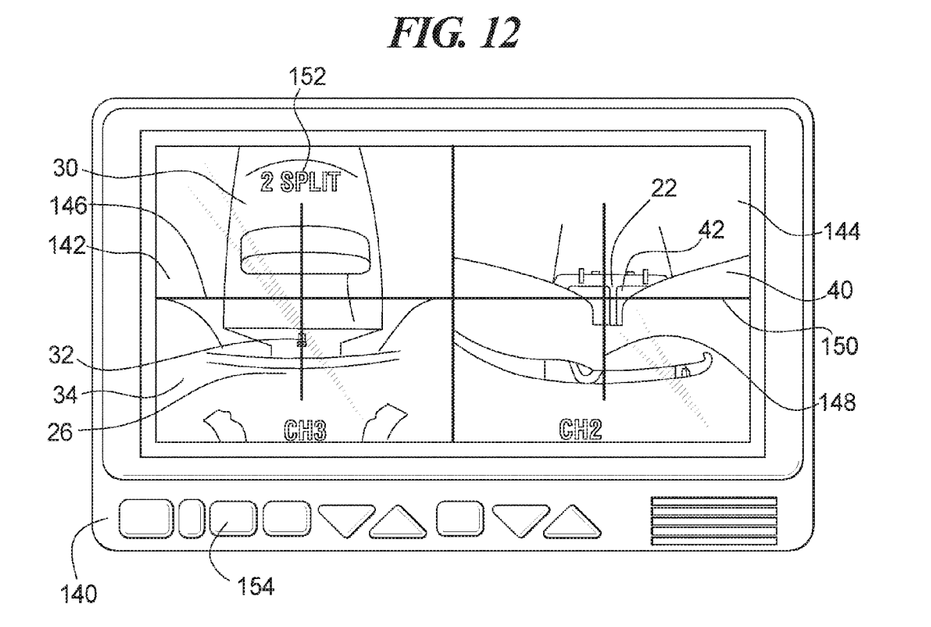
FIG. 12 is a view of the display screen within the vehicle showing the split screen view provided by the dual camera system.

An example of a display screen 140 is shown in FIG. 12. The display screen 140 may be mounted permanently or temporarily in the cab 22 of the vehicle 20, or may be unmounted, such as in a portable device such as a tablet computer or smart phone. The communications with between the components of the system, such between the camera housing and the display may be wired or wireless communications. In certain examples, the display screen 140 is mounted in the dashboard of the vehicle 20. The display screen 140 may be the display of a navigation system or other vehicle system such as for display of vehicle information or additional video signals. In the example, the user has selected the split screen display mode to show the rear facing video camera feed in the left half 142 of the screen and the forward facing camera in the right portion 144 of the screen. The user may select single screen displays or other display arrangements as desired. In the left screen portion 142, the display shows the trailer 30 with an air deflector mounted on the top front of the trailer. The display 142 shows the kingpin 32 extending downward from the underside of the trailer 30. A crosshair 146 is shown on the display to aid the driver in aligning the vehicle 20 with the kingpin 32. Also visible is the frame 26 and the rear wheels 34 of the vehicle 20. The view of the rearward facing camera is a wide angle view in the example.

The driver may watch the screen while backing the vehicle 20 toward the trailer 30, aligning the vehicle 20 to the trailer 30. As the vehicle is moved backward, the kingpin 32 passes overhead in the view provided by the display. The driver may steer the vehicle to ensure that the kingpin 32 stays in alignment with the vertical line of the crosshair 146. The driver may select the rearward facing camera view as the full screen view as desired.

The view in the right hand portion 144 of the display 140 shows the view of the forward facing video camera 70. In the forward view, the camera is a narrow angle view toward the throat opening 42 of the fifth wheel plate 40. The cab 22 of the vehicle 20 is visible above the fifth wheel plate 40. A view of the underside of the fifth wheel plate 40 is seen in the forward facing camera so that the latching mechanism 148 may be seen in the display. As the driver moves the vehicle 20 toward the trailer 20, the kingpin 32 comes into view on the right hand screen 144. As the kingpin 32 moves overhead in the view and toward the throat opening 42, the driver may keep the kingpin 32 aligned with the cross hair 150 in the display 144. The driver may determine not only right and left orientation of the vehicle to the trailer 30, but also may change the height of the frame of the vehicle 20 by operating the suspension air bags 38 to raise or lower the fifth wheel plate 40 to the proper height for coupling to the trailer 30. Once the plate 40 and kingpin are properly positioned and fully seated, display on the right screen 144 shows the latching mechanism for the hitch engaging. If the latch does not fully engage, the driver may see the failed latching operation in the display. An audible signal may be provided to indicate a latch condition, for example audible signals to indicate whether the latch has engaged or not.

The split screen view is indicated at the indicator 152. Other screen arrangements are possible, including the rear view to the right and front view to the left, full screen views of either camera, split screens by top and bottom portions of the display, two separate screens for the two views, or other arrangements. The views provided by the display are clear and unobstructed as a result of the lights 74 on the cameras and as a result of the user being able access and clean the lenses 72 and the lights 74. The need to clean the lenses 72 and lights 74 is reduced by the perimeter flange 78 and seal gasket 86 on the doors 56 that keeps out dust, dirt and moisture. Even if moisture such as rain, humidity or condensation, gets into the camera housing 46, the heating element 106 helps to keep the interior of the housing dry. The heating element 106 also helps to avoid icing of the housing so that the doors 56 automatically open even in cold weather.

A sensor may be provided in or on the camera housing to detect, for example, the trailer and/or the kingpin. The sensor may trigger a change in the view on the display screen, such as to switch the view from a split screen view to a full screen view of the front facing camera, or to switch from a full screen of the rear facing camera to a full screen of the front facing camera. Other actions may be taken as a result of the sensor.

The driver is able easily view the coupling operation of the hitch without the need for guesswork. The driver is able to easily see the latching of the latch without the driver needing to crawl under the trailer to view the coupling mechanism.

FIG. 12 shows controls 154 for the display 140 which may be used to control the operation of the present dual camera system or may be used for other purposes. For example, the controls 154 may include a power control, view control, brightness, magnification or zoom control, volume control for audible warnings, or the like.

Figure 13:
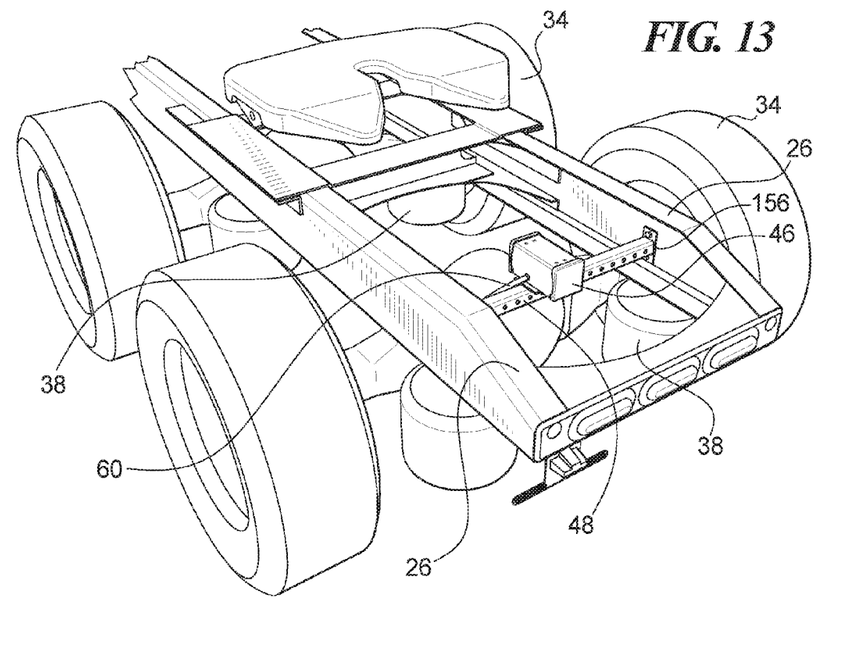
FIG. 13 is a perspective view of the dual camera system and mounting apparatus mounted in a truck frame.

FIG. 13 shows an example of the camera housing 46 mounted on a tractor frame 26. The rear wheels 34 are on the outside of the frame 26 and the cross beam 48 is mounted within the frame 26. In the example, the cross beam 48 is connected to the frame by a T-mounting 156 that has a base connected to the frame 26 and a projecting member that is inserted into the hollow interior of the cross beam 48. The camera housing 46 is mounted at a desired position on the cross beam 48 such as via mounting openings in the cross beam 48. The cables 60 may be seen extending from the camera housing 46, covered in protective covering sleeves. The camera housing 46 and cross beam 48 may be retrofit mounted on a vehicle 20 or may be provided as original equipment.

Figure 14:
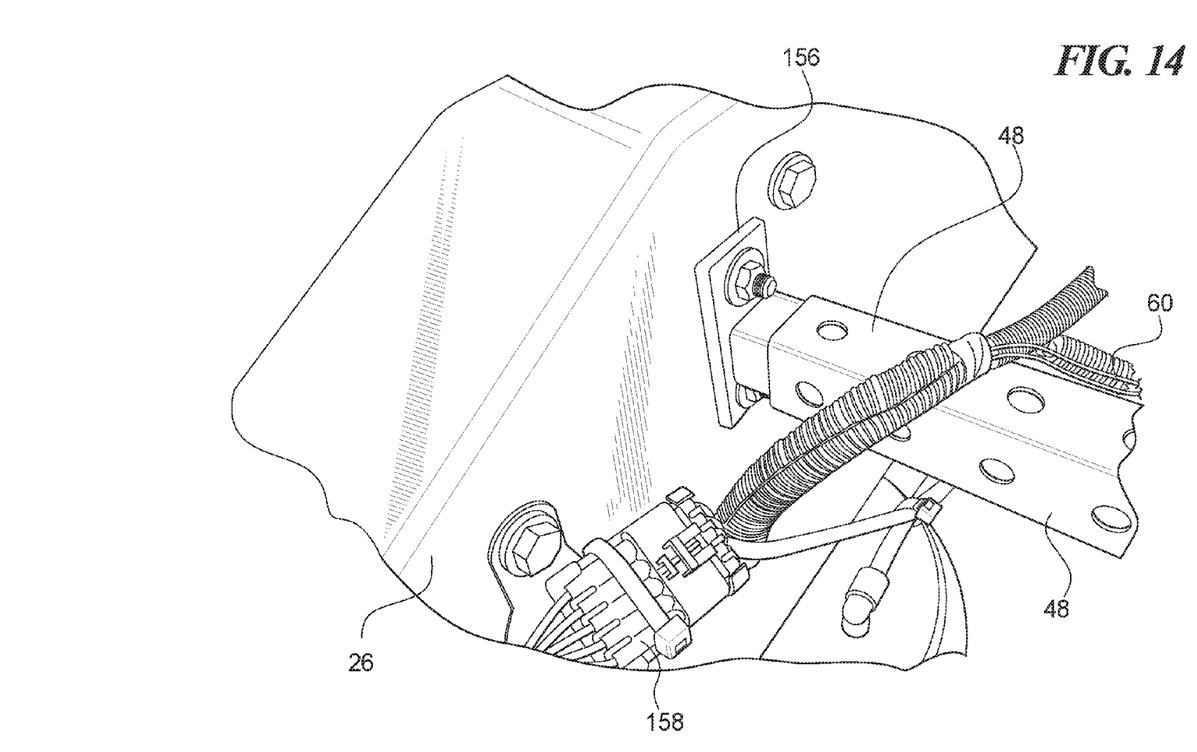
FIG. 14 is an enlarged view of the mounting apparatus for mounting the dual camera system in the truck frame.

In FIG. 14, the cross beam 48 is shown extending to the frame 26 and coupled by the T-mounting 156 to the inside surface of the frame 26 by bolts. The cables 60 of the camera housing 46 may be merged with other cabling of the vehicle 20 and connected via a cable connector 158, for example.

Figure 15:
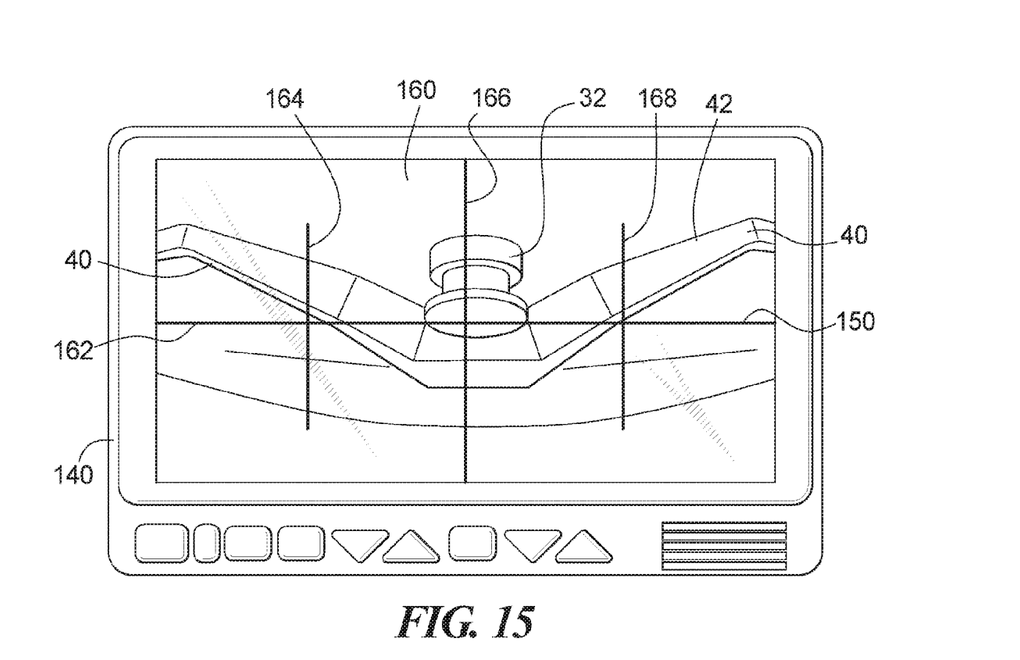
FIG. 15 is a screen shot of a full screen view of the kingpin entering the hitch plate.

With reference to FIG. 15, the display screen 140 shows a full screen view of the forward facing camera. In the displayed image, the underside 160 of the trailer 30 includes the kingpin 32 that has moved into view as the vehicle 20 is backed toward the trailer 30. The fifth wheel plate 40 has pivoted to a flat position when the trailer contacts it. The kingpin 32 is in position aligned generally with the center of the throat opening 42 for successful coupling of the trailer 30 to the vehicle 20. The display includes the crosshairs 150 including a horizontal crosshair 162 across the entire screen 140, and three vertical crosshairs 164, 166, and 168 at intervals along the horizontal crosshair 162. The crosshairs are used as a guide by the driver. In the illustrated embodiment, the location of the crosshairs is fixed relative to the display screen 140.

Figure 16:
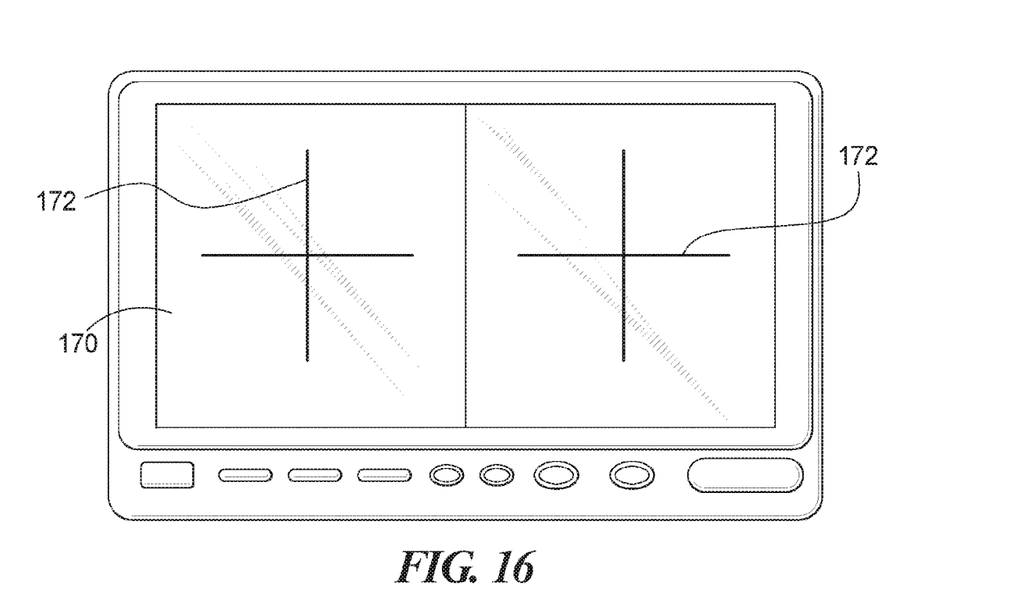
FIG. 16 is a screen shot of an alternate embodiment with alignment overlays in the camera.

An alternate embodiment is shown in FIG. 16, a display screen 170 is shown in which a split screen view is shown. Crosshairs 172 are shown in each of the displays. The crosshairs 172 are movable on the display by the user to permit the crosshairs 172 to be aligned with elements of the vehicle, the trailer, or other elements or positions. The user may adjust the angles of the cameras 70 as desired and then adjust the crosshair positions according to personal preference. The crosshair positions may be determined by sensors that sense elements of the vehicle and/or the trailer and set the crosshairs to a target position or object. The crosshairs 172 are overlays that may be positioned as delayed. The image in FIG. 16 is a test image used on a prototype device, and does not show an image from a camera mounted on a vehicle.

Additional sensors and cameras may be provided in or on the camera housing as desired.

In certain embodiments, the housing body includes a drain hole to permit water and other liquids and condensates to drain from the interior of the housing. The components used in the camera housing are designed to withstand water, including high pressure water directed at the components such as may occur in a truck wash, from wet roads, or from the truck being washed. The heater in the housing helps to drive the moisture out and to avoid fogging of the camera lens.

The present system may be configured to operate at low temperatures and high temperatures. In one example, the dual camera system will operate at temperatures of −40 F.

The present apparatus and method provides a two camera arrangement used to aid the coupling of a trailer with a king pin to a tractor truck with a fifth wheel hitch plate with a throat. The images from the cameras are typically displayed to the driver on a monitor in the cab to aid coupling to a trailer. When not being used for the coupling operation the monitor may be used for displaying video and image data, such as a rear view aid displaying video of using a separate mounted camera arranged to give a correct rear view for driving.

The present apparatus prevents soiling of the lens even though the camera is located in an area just behind and adjacent to the fifth wheel hitch plate, a location that collects a lot of dust and contamination from the road during normal operation, particularly when driven in rain, and snow. The present apparatus protects the camera from the effects of soiling and enhances its performance.

In a general application, a protective tube is constructed from a rigid material such as a metal that may be either an aluminum extrusion or a steel fabrication. The tube is arranged such that two cameras are mounted in the tube, one at each end of the tube. The cameras are arranged such that one camera views behind the truck. This camera is used to align the king pin on the trailer when reversing to couple a tractor and trailer. The second camera is located at the other end of the tube and faces forward. This camera views the open throat of the hitch plate on the tractor truck.

The housing has doors at each end to protect the cameras from dirt, water and snow. The doors in this case are operated by a rotary actuator that operates the doors via a linkage. A single rotary actuator is used to open the two opposing doors. As the actuator rotates, the linkage pushes the door, which is arranged to have a pivot on the door. This action opens the door to enable the two cameras to view their respective areas: 1) a rearward view of the king pin on the trailer, and 2) a forward view of the 5th wheel hitch plate opening.

As it is common for ice to build up around the structure, the linkage is arranged to have the ability to extend without damage even if it encounters an obstruction. In addition, the camera lenses will periodically require cleaning in order to provide a clear view. To facilitate the cleaning process, the linkages connecting the actuator and the door telescope in and out to allow the operator to manually open the protective door without damaging the linkage or actuator. The linkages include two sliding elements connected by a spring to maintain the shortest length. When hitting an obstruction, or if the door is manually opened, (such as would be the case to clean the camera lens) the spring enables the linkage to extend without damage to the actuator or door.

In certain embodiments a single actuator is used to operate both doors but using two actuators one for each door would archive the same result and is contemplated as an alternative. The actuator need not have a rotary motion, the same result may be achieved by using a linear actuator such as a lead screw or a pneumatic cylinder.

The length of the tube is not a critical feature of the apparatus; however, because of the extremely harsh environment that exists in this location on a truck, the entire camera assembly, door opening mechanism, and electrical components should all be enclosed inside of the tube for the reliable operation of the system. The positioning of the camera and size of the opening should be arranged to give a clear view of the trailer king pin and the hitch plate. It is beneficial to have the camera set back from the opening in such a way that the lens is shielded from rain and snow during operation when the doors are open. The tube enclosure protects the camera from accidental bumping and readjustment.

During low temperature use the camera may be provided with a lens heater to avoid condensation clouding the view. Likewise a heater arranged to prevent ice around the door to tube interface is provided in certain embodiments. This heater may take a number of different forms but for this embodiment a PTC (positive temperature control) film heater applied to the internal wall of the tube provides sufficient heat in cold-use to prevent the door from being obstructed by ice. The benefit of a PTC heater is the automatic current regulated by the semi conductive film changing resistance with temperature preventing over heating during operation in hot conditions. This avoids the use of a thermostat or temperature controller typically employed to control a pure resistive heater.

The doors in this embodiment have a lip or flange that wraps around the tube structure, further improving the protection of the cameras from dust and water. A lip seal or gasket on the inside provides additional protection. Should any water enter the structure, a drain hole is one way of preventing water build up.

The operation of the doors and camera are controlled in certain embodiments by an electronic module. The module receives a signal to open, either from selecting reverse gear, by operation of a switch, by proximity sensors sensing the approach of a trailer, or by other means. When the control module stops receiving the signal to open, the control module provides a delay when the signal is removed, keeping the doors open for a period of time, typically less than 1 minute, this, for example, enables the camera to provide visual confirmation that the king pin is securely latched in the hitch plate opening during the "tug test". This test is performed by the tractor moving forward with the trailer breaks preventing the trailer moving. This ensures the hitch lock is working and can be confirmed by viewing the front camera image.

In a different embodiment, a sensor (typically a proximity sensor or mechanical switch) may be incorporated to change the view in the monitor from a split screen showing the forward and reverse facing cameras at the same time, to a single full-screen view from one camera. This improves clarity of the image of interest, but is not a requirement for effective use of the system.

Proper positioning and alignment of the rear facing camera is important to enabling the camera system to be used to align tractor laterally with trailer and verify proper height of the tractor with the trailer, before engaging tractor under the trailer apron. This is accomplished by incorporating alignment "cross-hairs" in the monitor view to allow the driver to easily align the trailer and tractor both horizontally and vertically, before engaging the king pin and fifth-wheel.

Typically the camera will incorporate an internal IR light source to enable night operation as well as during daytime. When a non IR camera is used, separate or additional IR light sources may be mounted in the tube where they will be protected from dirt, water and snow.

Thus, there is shown and described a dual camera system for guiding a driver to connect a vehicle to a trailer. The video display provided to the driver may show two views of the coupling process. The views are kept clear and bright by seals on the housing, and flanges on the doors, as well as by heating elements within the housing. If the view becomes obscured by dirt or moisture, the driver may manually open the doors to the camera housing and wipe the lenses clean without requiring that the vehicle be running and without requiring that the vehicle be put into the reverse gear to automatically open the doors. The dual camera system is configured for retrofit into an existing vehicle or as original equipment with a new vehicle.

Although other modifications and changes may be suggested by those skilled in the art, it is the intention of the inventors to embody within the patent warranted hereon all changes and modifications as reasonably and properly come within the scope of their contribution to the art.

We claim:

1. A camera system for a vehicle, comprising:
   a housing body having first and second ends;
   first and second doors mounted on respective first and second ends of the housing body;
   a door opener coupled to the first and second doors and operable to move the first and second doors between an open position and a closed position; and
   first and second cameras within the housing body.

2. A camera system as claimed in claim 1, further comprising:
   a perimeter flange on the first and second doors, the perimeter flange being positioned overlapping portions of a top and sides of the housing body when the first and second doors are in a closed position.

3. A camera system as claimed in claim 1, further comprising:
   first and second seals mounted between the housing body and respective ones of the first and second doors when the first and second doors are in the closed position.

4. A camera system as claimed in claim 1, further comprising:
   a heating element mounted within the housing body, the heating element being operable to heat at least one of the housing body and an interior space of the housing body.

5. A camera system as claimed in claim 1, further comprising:
   a cross beam configured for connected between frame members of a vehicle, the housing body being mounted on the cross beam; and
   first and second T-mounting members each having a first portion extending into the cross beam and each having a second portion configured for mounting on surfaces of the frame members that face each other.

6. A camera system as claimed in claim 1, further comprising:
   output cables extending from the housing body, the output cables including first and second video cables and a door activation signal cable.

7. A camera system as claimed in claim 1, wherein the door opener includes:
   a motor or actuator in the housing body, the motor or actuator including an output; and
   first and second linkages connected between respective ones of the first and second doors and the output of the motor or actuator,
   wherein the motor or actuator is operable to automatically move the first and second doors between the open position and the closed position.

8. A camera system as claimed in claim 7, wherein the first and second linkages are sliding linkages, and further comprising:
   first and second springs connected to the first and second linkages, the first and second springs being operable to move doors to a closed position during automatic moving of the doors from the open position to the closed position; and
   the first and second linkages being configured to permit manual opening of the first and second doors when the first and second doors are in a closed position by overcoming a spring force of the first and second springs.

9. A camera system as claimed in claim 8, wherein the first and second linkages each include an inner linkage element and an outer sliding sleeve that are slidably movable relative to one another.

10. A camera system as claimed in claim 7, further comprising:
    first and second arms connected between the output of the motor or actuator and respective ones of the first and second linkages.

11. A camera system as claimed in claim 10, wherein the motor or actuator includes a motor operable to move the first and second arms between a first position and a second position that are approximately at right angles to one another.

12. A method of displaying a vehicle hitch during coupling of the vehicle hitch to a trailer, comprising:
    receiving a signal indicating that a vehicle has been shifted into a reverse gear;
    opening first and second doors on a camera housing;
    activating first and second video cameras within the camera housing, the first and second video cameras being directed to obtain video information of a coupling operation between the vehicle hitch and the trailer; and
    displaying a video signal from at least one of the first and second video cameras to a driver of the vehicle.

13. A method as claimed in claim 12, further comprising:
receiving a signal indicating that the vehicle has been shifted out of the reverse gear;
continuing to display the video signal to the driver of the vehicle for a predetermined time period;
deactivating the first and second video cameras following the predetermined time; and
closing the first and second doors on the camera housing following the predetermined time.

14. A method as claimed in claim 12, wherein the opening of the first and second doors includes operating a motor having first and second arms connected to first and second linkages to pivot the first and second doors to an open position.

15. A method as claimed in claim 12, further comprising:
receiving a signal indicating that the vehicle has been shifted out of the reverse gear; and
closing the first and second doors on the camera housing, the closing including applying a spring force to the doors during closing movement, wherein the doors may remain open during the automatic closing operation if subject to interference.

16. A dual camera apparatus for use on a semi tractor truck for displaying a fifth wheel hitch during coupling to a trailer, comprising:
a cross beam configured for connection between opposing frame members of the semi tractor truck;
a camera housing mounted on the cross beam, the camera housing including a housing body having openings at first and second opposite ends;
first and second doors pivotably mounted on the housing body at the first and second opposite ends, the first and second doors being pivotable to close the openings of the housing body;
first and second video cameras mounted within the housing body and directed to obtain video information from the openings in the housing body;
a motor mounted within the housing body, the motor having an output;
first and second arms mounted to the output of the motor;
first and second linkages connected between respective ones of the first and second arms and respective ones of the first and second doors;
the motor being operable to move the first and second doors between a closed position and an open position via the first and second arms and the first and second linkages;
first and second springs connected to respective ones of the first and second linkages to exert a spring force that is directed to close the respective first and second doors;
the first and second linkages being sliding linkages to permit manual opening of the first and second doors by overcoming the spring force of the respective first and second springs; and
a heating element mounted within the housing body and operable to heat at least one of the housing body and an interior of the housing body.

* * * * *